United States Patent [19]

Takabatake

[11] 4,118,240

[45] Oct. 3, 1978

[54] ALUMINUM TITANATE COMPOSITION BEING STABLE AT HIGH TEMPERATURE

[75] Inventor: Mitsuo Takabatake, Yokohama, Japan

[73] Assignee: Asahi Glass Company Ltd., Tokyo, Japan

[21] Appl. No.: 823,740

[22] Filed: Aug. 11, 1977

[30] Foreign Application Priority Data

Sep. 14, 1976 [JP] Japan ................................ 51-109421

[51] Int. Cl.² ...................... C04B 35/02; C04B 35/44; C04B 35/46; C04B 35/50
[52] U.S. Cl. ................................... 106/73.33; 106/65; 106/69; 106/73.2
[58] Field of Search ................... 106/73.33, 73.3, 73.2, 106/73.4, 65

[56] References Cited

U.S. PATENT DOCUMENTS

| B 502,773 | 1/1976 | Sowman | 106/73.33 |
| 2,776,896 | 1/1957 | Harman et al. | 106/73.33 |
| 2,962,452 | 11/1960 | Counts et al. | 106/73.33 |
| 3,316,108 | 4/1967 | Blomberg | 106/65 |
| 3,534,286 | 10/1970 | Holm et al. | 106/73.33 |
| 3,890,140 | 6/1975 | Asbury | 106/73.33 |

*Primary Examiner*—Helen M. McCarthy
*Attorney, Agent, or Firm*—Oblon, Fisher, Spivak, McClelland & Maier

[57] ABSTRACT

Aluminum titanate composition being stable at high temperature comprises 1.5 to 20 wt. % of Sn component as $SnO_2$ and/or 0.5 to 10 wt. % of rare earth element component as rare earth oxide.

6 Claims, No Drawings

ALUMINUM TITANATE COMPOSITION BEING STABLE AT HIGH TEMPERATURE

BACKGROUND OF THE INVENTION

1. Field of the Invention

The present invention relates to aluminum titanate having high strength which is stable at high temperature especially even at high temperature in a reducing atmosphere.

2. Description of the Prior Arts

The ceramic compositions have various characteristics but have disadvantages of relatively low thermal shock resistance, whereby the usages are limited.

It has been well known that the most effective method for improving the disadvantage of low thermal shock resistance is to impart low thermal expansion for the ceramics. Various proposals have been made. The ceramics having low thermal expansion such as lithium compounds e.g. $\beta$-spodumene ($Li_2O.Al_2O_3.4SiO_2$) and aluminum-magnesium silicate ($2MgO.2Al_2O_3.5SiO_2$) and aluminum titanate ($Al_2O_3.TiO_2$) are used in suitable shape. The $\beta$-spodumene and aluminum-magnesium silicate have been practically used as ceramics for tablewares and gas burner devices.

However, $\beta$-spodumene (melting point of 1430° C.) and aluminum-magnesium silicate (melting point of 1470° C.) have low melting point whereby they can be used for only limited special usages even though they are excellent materials. Accordingly aluminum titanate (melting point of 1860° C.) has been studied as ceramics having low thermal expansion which can be used in the applications for high thermal shock resistance such as the iron steel manufacture.

The aluminum titanate has anisotropic characteristic in crystallography and has different coefficients of thermal expansion in crystallographic axes such as $-26 \times 10^{-7}$ ° $C^{-1}$ in the a axis direction; $118 \times 10^{-7}$ ° $C.^{-1}$ in the $b$ axis direction; and $194 \times 10^{-7}$ ° $C^{-1}$ in the $c$ axis direction.

The average coefficient of thermal expansion is not so small. However, in the sintered product obtained by bonding aluminum titanate particles having anisotropic characteristic, a large thermal stress (tensile stress) is internally formed in the directions of the $b$ axis and the $c$ axis because of the differences of coefficients of thermal expansion in the directions of crystallographic axes whereby many fine cracks are caused in the direction perpendicular to the $b$ axis and the $c$ axis so as to release stress. As the result, the coefficient of thermal expansion of the sintered product is mainly dependent upon the coefficient of thermal expansion in the $a$ axis direction whereby aluminum titanate imparts remarkably low coefficient of thermal expansion. On the other hand, the strength of aluminum titanate is low because of the internal fine cracks.

The relation of the low thermal expansion and low strength of the aluminum titanate sintered product has considered as mentioned above.

There is the other problem of decomposition of aluminum titanate at high temperature which prevent practical applications of aluminum titanate sintered products.

The decomposition has been considered that $Al^{+3}$ sites in the aluminum titanate crystals are remarkably larger than the ionic radius of $Al^{+3}$ whereby $Al^{+3}$ are taken out from the sites at high temperature. As the result, the amount of $Al_2O_3$ gradually increases and the coefficient of thermal expansion gradually increases. The $Ti^{+3}$ formed by reducing $Ti^{+4}$ are entered into the vacancies formed by taking out $Al^{+3}$. Accordingly, when aluminum titanate is used at high temperature in the reducing atmosphere, the change of the lattices may be easily caused.

It has been studied to overcome the disadvantage of the decomposition at high temperature which is fatal defect among the above-mentioned two disadvantages of the lowering of strength and the decomposition at high temperature.

It has been proposed to inhibit the decomposition of aluminum titanate at high temperature by substituting a part of $Al^{+3}$ sites with $Mg^{+2}$, $Fe^{+3}$ or $Cr^{+3}$ by solid-solubilizing MgO, $Fe_2O_3$ or $Cr_2O_3$ into aluminum titanate (U.S. Pat. No. 2,776,896; Japanese Patent Publication No. 26688/1967 and Japanese Unexamined Patent Publication No. 23113/1977). The ionic radius of the ions has only slight larger than the ionic radius of $Al^{+3}$ whereby the effect for inhibiting the decomposition at high temperature is not enough high.

SUMMARY OF THE INVENTION

It is an object of the present invention to provide aluminum titanate composition being stable at high temperature whose decomposition at high temperature is inhibited.

It is the other object of the present invention to provide aluminum titanate composition which is stable under inhibiting the decomposition at high temperature in a reducing atmosphere.

The foregoing and other objects of the present invention have been attained by providing aluminum titanate composition being stable at high temperature which comprises 1.5 to 20 wt. % of the Sn component as $SnO_2$ and/or 0.5 to 10 Wt. % of the rare earth element component as rare earth oxide.

DETAILED DESCRIPTION OF THE PREFERRED EMBODIMENTS:

As the results of various studies for overcoming disadvantages of the known additives for inhibiting the decomposition at high temperature, it has been found that remarkable effect for inhibiting the decomposition of aluminum titanate could be attained by adding the Sn component and/or the rare earth element component.

The function and effect of the Sn component and/or the rare earth element component have not yet clearly understood. However, it is considered as follows.

The reason of decomposition of aluminum titanate at high temperature is presumed that, because of smaller ionic radius of $Al^{+3}$ than the space of $Al^{+3}$ sites, and intense lattice vibration at high temperature, $Al^{+3}$ can be easily taken out of its site.

When $Sn^{+4}$ and/or the rate earth element ions are solid-solubilized into the aluminum titanate crystals, the ionic radius of $Sn^{+4}$ or the rare earth element ions is larger than the ionic radius of $Al^{+3}$ and the ionic radius of $Mg^{+2}$, $Fe^{+3}$ or $Cr^{+3}$, and is just fitted to the sites of the $Al^{+3}$ sites in the aluminum titanate crystals and lattice is slightly distorted so as the $Al^{+3}$ sites can tightly grasp $Al^{+3}$ ions. Because of the above effects, the decomposition at high temperature can be inhibited.

The amount of the Sn component is preferably 1.5 to 20 wt. % as $SnO_2$ (weight percent to aluminum titanate component without impurities) because the effect of the Sn component is not remarkable at the ratio of less than 1.5 wt. % as $SnO_2$ and the aluminum titanate is not easily produced and the mixture of $Al_2O_3$, $TiO_2$ and $SnO_2$ is easily formed (according to X-ray analysis) in the conventional fabricating condition at the ratio of more than 20 wt. % as $SnO_2$. The object of the present invention is not attained. From the economical viewpoint, the amount of the Sn component is especially 2 to 10 wt. % as $SnO_2$. It has been also found that the strength of aluminum titanate is increased as the additional effect of the addition of the Sn component.

The amount of the rare earth element component is preferably 0.5 to 10 wt. % as the rare earth oxide, because the effect of the rate earth element component is not remarkable at the ratio of less than 0.5 wt. % as the rare earth oxide and the resulting aluminum titanate may be porous at the ratio of more than 10 wt. % as the rare earth oxide. The amount of the rare earth element component is especially 1 to 5 wt. % as the rare earth oxide.

Suitable rare earth elements include La, Ce and Y.

The Sn component and the rare earth element component can be usually added as oxides thereof. Thus, it is possible to add as chlorides, hydroxide, nitrates, acetates and oxalates thereof. These components can be added to raw materials such as alumina and titania and also can be added to clinker of aluminum titanate. When these components are added as oxides, it is preferable to use powder having particle size of 100 mesh pass. When these components are added in the water soluble compound, it is possible to add them in a form of aqueous solutions.

In order to use the aluminum titanate composition in practical applications, it is necessary to improve the other disadvantage of low strength.

The inventors have found that the addition of $SiO_2$ component is remarkably effective for the purpose.

The function and effect of the $SiO_2$ component is not clearly understood. However, it is considered that the effect for increasing strength of the aluminum titanate is attained by synergistic effect of the $SiO_2$ component with the Sn component and the rare earth element component.

Certain effect for increasing strength of the aluminum titanate composition can be found by the addition of the Sn component and the rare earth component without the addition of the $SiO_2$ component. However, it is preferable to add the $SiO_2$ component at the ratio of 2 to 13 wt. % preferably 3 to 10 wt. % to the aluminum titanate component. The effect for increasing strength is not substantially found at the ratio of less than 2 wt. %. The coefficient of thermal expansion is too high at the ratio of more than 13 wt. %. The above-mentioned range is suitable from the practical consideration.

It is preferable to add silica especially silica sand as the $SiO_2$ component. The particle size of silica is preferably 100 mesh pass.

The impurities in the raw materials and the other components added for improving processability affect to the crystalline structure and the effect of the present invention may be deteriorated. Accordingly, it is preferable to decrease the amount of the impurities and/or these components to be less than 5 wt. %.

It is possible to add other components such as Mg component, Fe component or Cr component which amount is preferably less than 5 wt. % (oxide base), if necessary.

The Sn component and the rare earth element component can be added as $SnO_2$ or the rare earth oxide as well as the Sn metal or the rare earth metals and the other Sn compounds or the rare earth compounds which can be converted to oxides thereof in the sintering step.

The particle size of the components can be selected as desired though it is not preferable to use particles having a diameter of larger than $150\mu$.

The Sn component and the rare earth element component can be powdery form as well as a solution, if necessary. The mixture of these components is molded in suitable shape and it is sintered at 1400° to 1700° C. preferably 1450° to 1600° C. to form the aluminum titanate composition. The invention will be further illustrated by certain examples to show the effects of the present invention.

EXAMPLES 1 TO 4 AND REFERENCES 1 TO 3:

The industrial grade powdery oxides of $Al_2O_3$, $TiO_2$, $SnO_2$, $La_2O_3$, $CeO_2$, $Y_2O_3$ and $Fe_2O_3$ (200 mesh pass) and $SiO_2$ (100 mesh pass) were weighed as shown in Table 1 and were blended under pulverizing the mixture by a vibration mill for 2 hours. The mixture was granulated and molded by the isostatic press under the pressure of 1000 kg/cm², and the molded composition was sintered at 1530° C. for 4 hours.

The typical characteristics of the sintered products are also shown in Table 1. According to the X ray analysis, the sintered products had aluminum titanate component as the main component.

The sintered products were used as samples and were repeatedly treated in a reducing atmosphere at the cycle of 400° ⇌ 900° C. in each 10 minutes intervals for 150 times. The characteristics are also shown in Table 1.

As it is clear from the examples, the decomposition of aluminum titanate was not found in the sintered products of the present invention. Accordingly, the coefficients of thermal expansion of the sintered products were not changed by the treatment. It is clearly found that the sintered products are stable.

It is also found that the strength of the sintered product is improved by the synergistic effect of the addition of the $SiO_2$ component.

Table 1

| | Sample | | | | | | |
|---|---|---|---|---|---|---|---|
| | Exp. 1 | Exp. 2 | Exp. 3 | Exp. 4 | Ref. 1 | Ref. 2 | Ref. 3 |
| Composition (wt.%) | | | | | | | |
| $Al_2O_3$ | 53 | 55 | 55 | 55 | 56 | 56 | 50 |
| $TiO_2$ | 37 | 38 | 38 | 38 | 39 | 44 | 43 |
| $SnO_2$ | 5 | — | — | — | — | — | — |
| $La_2O_3$ | — | 2 | — | — | — | — | — |
| $CeO_2$ | — | — | 2 | — | — | — | — |
| $Y_2O_3$ | — | — | — | 2 | — | — | — |
| $Fe_2O_3$ | — | — | — | — | — | — | 2 |
| $SiO_2$ | 5 | 5 | 5 | 5 | 5 | — | 5 |
| After sintering | | | | | | | |
| Coefficient of shrinkage by sintering (%) | 6 | 6 | 6 | 6 | 6 | 5 | 6 |

Table 1-continued

| | Sample | | | | | | |
|---|---|---|---|---|---|---|---|
| | Exp. 1 | Exp. 2 | Exp. 3 | Exp. 4 | Ref. 1 | Ref. 2 | Ref. 3 |
| Coefficient of thermal expansion (° $C^{-1}$) (20 to 1000° C) | $12 \times 10^{-7}$ | $8 \times 10^{-7}$ | $10 \times 10^{-7}$ | $5 \times 10^{-7}$ | $12 \times 10^{-7}$ | $12 \times 16^{-7}$ | $12 \times 10^{-7}$ |
| Bending strength (room temp.) (kg/cm²) | 330 | 240 | 215 | 190 | 180 | <20 | 170 |
| After cycle treatment | | | | | | | |
| Coefficient of thermal expansion (° $C^{-1}$) (20 to 1000° C) | $12 \times 10^{-7}$ | $8 \times 10^{-7}$ | $10 \times 10^{-7}$ | $5 \times 10^{-7}$ | $20 \times 10^{-7}$ | $30 \times 10^{-7}$ | $15 \times 10^{-7}$ |
| Bending strength (room temp.) (kg/cm²) | 350 | 230 | 220 | 180 | 150 | <20 | 160 |
| X ray analysis decomposition | none | none | none | none | small α-$Al_2O_3$ | much $Al_2O_3$ $TiO_2$ | none |

The samples of the sintered products prepared in Examples 1 to 4 and References 1 to 3 were tested in a reducing atmosphere on the reactivity to a molten iron.

Each crucible was prepared by forming a cavity having a diameter of 30 mm and a height of 20 mm in each sample. An iron ball was put in the cavity and the outer space was filled with carbon. The crucible was heated at 1550° C. for 12 hours.

The results are shown in Table 2. As it is clear from the results of Table 2, the sintered products of the invention were not substantially decomposed and were quite stable in comparison with the other sintered products.

Table 2

| | Coefficient of thermal expansion (° $C^{-1}$) (20 - 1000° C) | X ray analysis |
|---|---|---|
| Exp. 1 | $22 \times 10^{-7}$ | Mostly aluminum titanate only small amount of α-$Al_2O_3$ |
| Exp. 2 | $15 \times 10^{-7}$ | " |
| Exp. 3 | $13 \times 10^{-7}$ | " |
| Exp. 4 | $15 \times 10^{-7}$ | " |
| Ref. 1 | $60 \times 10^{-7}$ | Completely decomposed to α-$Al_2O_3$ and $TiO_2$ |
| Ref. 2 | $75 \times 10^{-7}$ | Completely decomposed to α-$Al_2O_3$ and $TiO_2$ |
| Ref. 3 | $13 \times 10^{-7}$ | Mostly aluminum titanate only small amount of α-$Al_2O_3$ |

After the tests, the molten iron was easily separated from the crucible without adhesion. There was no symptom of the reaction on the contacted surface. The fact shows that the sintered product of the present invention can be used as the substrate contacting with the molten iron in the iron and steel industry.

What is claimed is:

1. An aluminum titanate composition having a low coefficient of thermal expansion (20° to 1000° C.) and which is stable at high temperatures and essentially unaffected by reducing atmospheres at high temperatures which consists essentially of 1.5 to 10 wt. % of $SnO_2$, 2-13 wt. % of $SiO_2$ and aluminum titanate.

2. The aluminum titanate composition of claim 1, which contains 2 to 10 wt. % $SnO_2$.

3. The aluminum titanate composition of claim 1, which contains 3 to 10 wt. % of $SiO_2$.

4. An aluminum titanate composition having a low coefficient of thermal expansion (20° to 1000° C.) and which is stable at high temperatures and essentially unaffected by reducing atmospheres at high temperatures which consists essentially of 0.5 to 10 wt. % of a rare earth metal oxide, 2 to 13 wt. % of $SiO_2$ and aluminum titanate.

5. The aluminum titanate composition of claim 4, which contains 1 to 5 wt. % of the rare earth metal oxide.

6. The aluminum titanate composition of claim 5, which contains 3 to 10 wt. % of $SiO_2$.

* * * * *